May 20, 1952 E. W. BORROW 2,597,441
GRASS AND OTHER AGRICULTURAL GREEN CROP DRYING PLANT
Filed April 18, 1949 2 SHEETS—SHEET 1
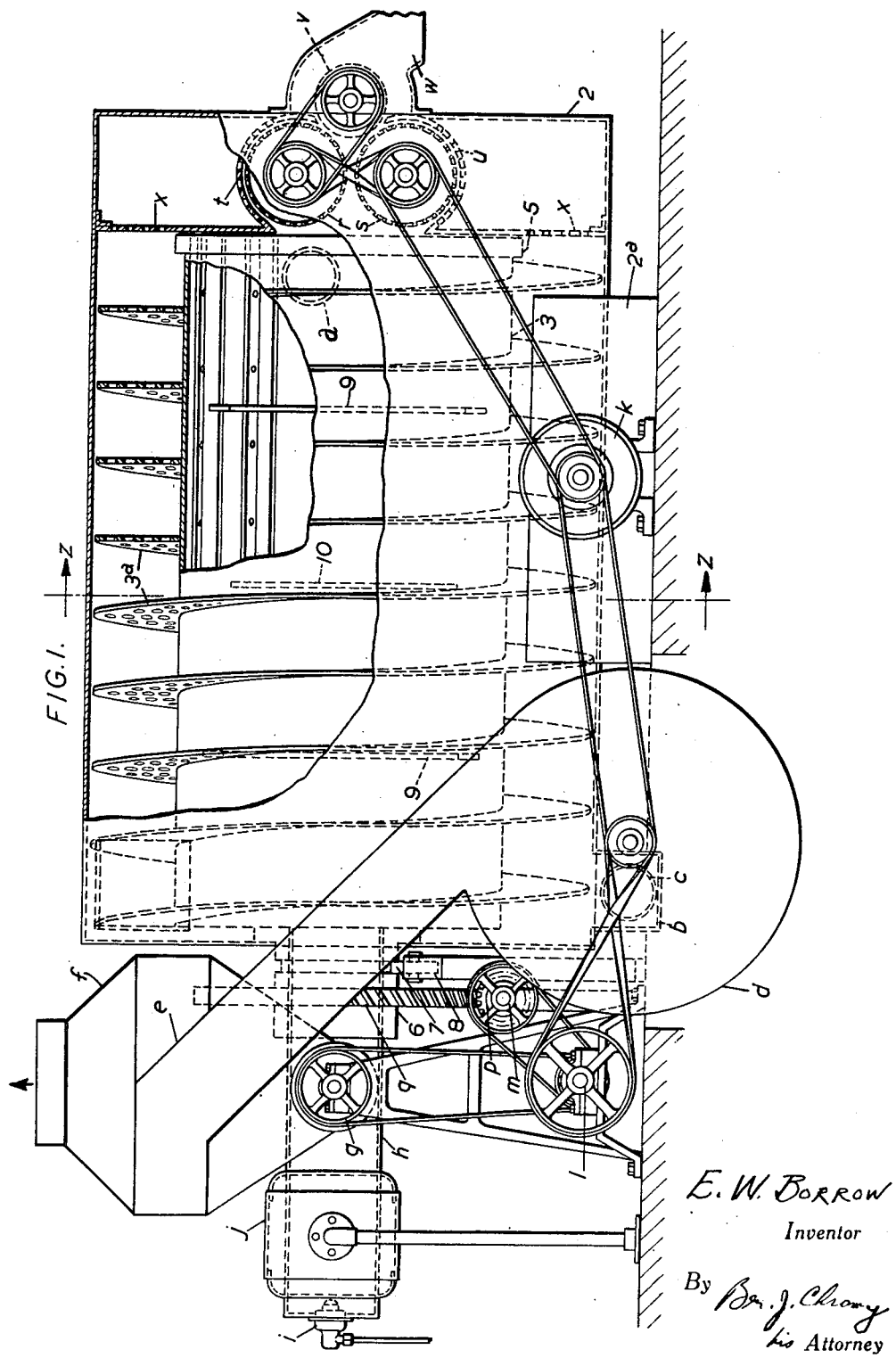
E. W. Borrow
Inventor
By Bn. J. Chromy
his Attorney

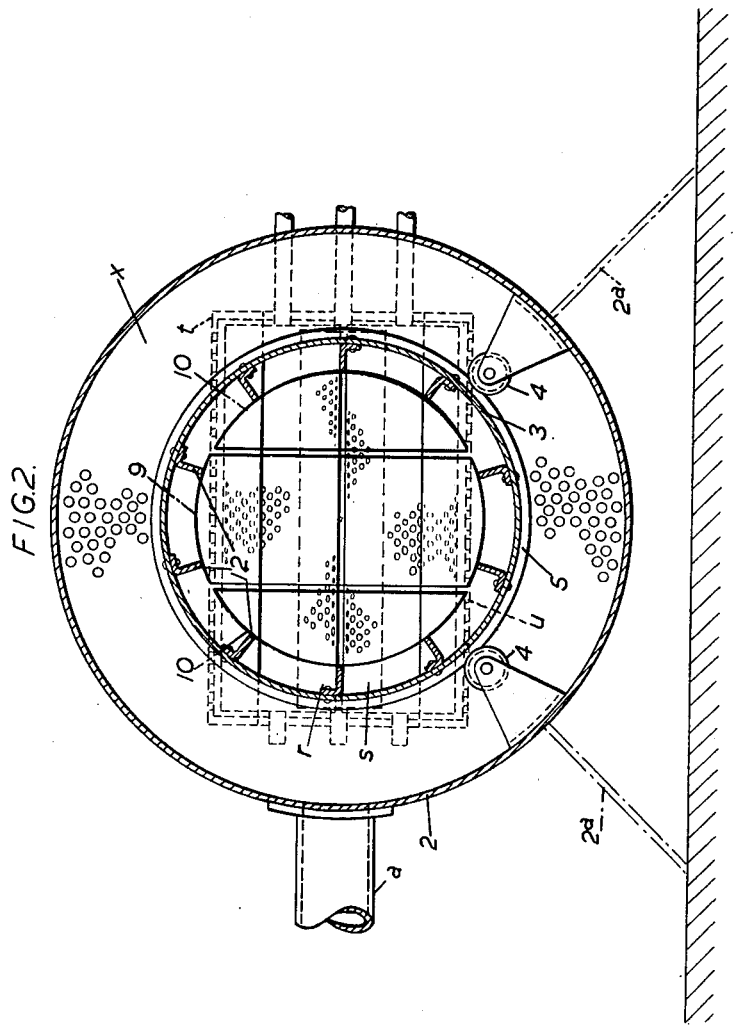

Patented May 20, 1952

2,597,441

UNITED STATES PATENT OFFICE 2,597,441

GRASS AND OTHER AGRICULTURAL GREEN CROP DRYING PLANT

Edgar Wilfred Borrow, Cowplain, Portsmouth, England

Application April 18, 1949, Serial No. 88,088
In Great Britain April 21, 1948

6 Claims. (Cl. 34—57)

This invention relates to improvements in plant for drying green grass or other agricultural green crop to conserve such crop for animal feeding stuffs.

More specifically the invention relates to drying plant or driers of the pneumatic drum type in which the crop is cut into chaff or shredded into short lengths before drying, the chaff being fed into a hot air stream in which it is dried to the required extent.

According to the invention plant for drying green cut grass or the like comprises a stationary external drum, a rotatable inner drum so arranged that rotation thereof will cause green cut grass (or the like) fed into the space between the drums near to one end to be passed to an outlet near the other end, means for so feeding hot air to that space that green cut grass (or the like) so fed into it will be partially dried in passing through it, means for sucking a current of hot air through the inner drum and for so feeding the partially dried grass into that current that it can be carried by the current through the inner drum and its drying thereby completed, and means for separating the fully-dried grass from the air current.

The means for feeding hot air to the space between the drums may consist substantially of means for causing to be sucked through that space the air which has been used for the final drying operation.

The internal drum, according to a further feature of the invention, is provided with worm vanes or blades upon the exterior, said vanes feeding the cut grass along the drum chamber through which hot air is continually drawn to effect pre-drying.

Further features of the invention will be seen from the following description and drawings.

From the end of the chamber the cut grass is drawn by a powerful, large air volume fan and blown into a hopper or cyclone from which the predried grass is fed into the interior of the drying drum, this being fitted with baffles and paddles or vanes which stir and lift and drop the cut grass during the final drying stage.

The end of the drying drum terminates in a space in the drum chamber in which space a dried grass collecting appliance is provided. This appliance may take the form of a pair of wire netting or perforated screen drums through which the air can pass whereas the grass is collected, the drums rotating like a pair of wringer rollers, the grass passing between the drums or into a collecting hopper or into a grinding machine which produce grass meal.

Hot drying air is supplied in the normal manner for grass drying plants, from a furnace which is preferably oil fired or coke or other smokeless fuel may be used.

The exhaust gases from the furnace are drawn into an air mixing chamber in which sufficient cool air is admitted to supply drying air at correct temperature to the drier drum.

Referring to the accompanying drawings which show one embodiment of the invention Figure 1 is a side view of a drying plant, Figure 2 is a sectional view on line Z—Z of Figure 1.

Referring now to the drawings number 2 denotes an external drum firmly mounted on the ground by means of plate leg members 2a.

The green crop and more particularly green grass is cut into chaff or shredded or otherwise broken up so as to facilitate the evaporation of moisture and is fed into drum 2 through a duct a and passed therethrough as will be further described and discharges into a collecting box or hopper b from which it is drawn into duct c by a powerful large volume air circulating fan d which discharges through duct e into a known form of cyclone or collecting hopper f in which the cut grass is collected and fed by means of a known type of worm feeding device or conveyor g into the hot air duct h which is provided externally with an oil fuel or other type burner i and an air mixing chamber j.

External drum 2 has mounted therein internal drying drum 3 this being carried by roller bearings 4 supporting drum 4 by means of track 5 at one end of the drum and by a tubular member 6 supported by rollers 7 carried by a support 8 at the other end of the drum. Internal drum 3 is provided with perforated type of vanes 3a mounted externally thereon to approach into close proximity to the interior of the external drum 3.

Internal drum 3 is provided with a pair of central baffle plates 9 spaced as shown in Figures 1 and 2 and a pair of side baffle plates 10 which are mounted as shown in Figures 1 and 2 by being secured to a plurality of longitudinal agitating ribs 12 said baffle plates 9 and 10 being arranged to deflect the predried cut grass chaff during its passage through drum 3.

Motive power may be supplied to the drying plant by an electric motor k or other power source which drives fan d and, by means of shafting l and suitable pulley and belt means, motive power is supplied to worm g and other pulley and belt means impart motive power through shaft m to pinion p which engage a large diameter spur gear q secured to tubular member 6.

The drying plant is primarily intended for drying green grass which is cut by a chaff cutting machine or like implement into short lengths and if the grass contains stemmy parts these are crushed or pulped in a suitable machine in known manner the material being suitable for being carried by the air suction produced by fan $d$ through duct $a$ into the interior of drum 2 in the space between vanes $3a$ mounted externally upon drum 3. The cut grass may be green or dry or it may be wet due to rain, dew or the like but owing to the perforations in vanes $3a$ it will be trapped by the vanes and generally falls to the bottom internally in drum 2 where it is moved forward due to the mechanical action of the worm shaped vanes $3a$ during rotation of drum 3.

Due to the mechanical feeding forward of the material predrying is effected during the passage of the material through the space between the exterior of drum 3 and the interior of drum 2 and finally the cut grass falls or is sucked into collecting box or hopper $b$ from which it is drawn by air suction into fan $d$ which, through duct $e$, deposits the cut grass in cyclone $f$ from which the hot moist air escapes into the atmosphere, the predried cut grass being fed into worm conveyor $g$ and by this into duct $h$.

This duct $h$ as will be seen in Figure 1 will be provided with an oil burner $i$ the combustion gases from which are mixed with a predetermined amount of cooling air in mixing chamber $j$, the temperature of the effluent air-gas mixture being regulated so as to effect drying of predried cut grass in the shortest possible time without risk of scorching or burning the predried cut grass fed into duct $h$ by conveyor $g$.

Owing to the predrying of cut grass it is found necessary to rotate conveyor $g$ so as to eject the predried cut grass into duct $h$ at a fairly high speed and in the form of a spray so that the particles of material will be carried by the hot air gas mixture into the interior of drum 3 where it strikes baffles 9 and 10 which cause the cut grass to fall into the bottom of drum 3 where it is picked up by agitating ribs 12 which cause lifting and dropping of the grass with consequent agitation during its passage through drum 3.

At the end of drum 3 the cut finally dried grass is drawn by the air draught in between a pair of perforated roller screens $r$ and $s$ which rotate within fixed screens $t$ and $u$ and are rotated by belt and pulley means from motor $k$ the cut grass being trapped by the perforated roller screens $r$ and $s$ and finally collected by roller $v$ which feeds the material in the form of a compressed band through discharge outlet $w$.

The drying air after passing internally through drum 3 passes through screen rollers $r$ and $s$ through the perforated screens $t$ and $u$ and through perforated plated portions $x$ in a plate member separating the air space between drum 2 and 3 and the interior of drum 2 as shown in Figure 1.

From the above described construction it will be appreciated that the air suction created by fan $d$ causes drying air and combustion gas mixture to be sucked through duct $h$ from burner $i$ and air mixing chamber $j$.

The air and combustion gas mixture passing through duct $h$ has the predried cut grass ejected or sprayed thereinto so as to carry this forward in the form of a spray or like flakes in a snow storm it being important to avoid the cut grass forming lumps or caking on the walls of the drums as this may cause scorching and burning.

The cut grass is carried internally through the interior of the rotating drying drum thus using dry hot air gas mixture for the final drying of the cut grass.

The temperature of the combustion gas and air mixture is therefore regulated to conform to the rate of feeding of predried cut grass and to the moisture content and nature of the grass.

From the interior of the drum the drying air passes through the grass collector appliance and through dust screens $t$, $u$ and $x$ into the space between the outer drum 2 and inner drum 3 where the cut grass is fed in through duct $a$, the suction from fan $d$ extending through the space between drums 2 and 3.

During the passage of the cut shredded or otherwise prepared green and/or wet grass through the space between drums 2 and 3 the cut grass is exposed to the drying air and combustion gas mixture which has been used for final drying of the cut grass during its passage through the interior of drum 3 so that the predrying air stream is partly cooled and carries a certain amount of moisture, there is therefore less risk of burning or scorching of the material during the predrying process and consequently vanes $3a$ are utilised to feed the material forward slowly churning this up the sides of the walls of the interior of the drum 2, the vanes $3a$ being perforated so as to permit the passage of the moisture laden drying air through the vanes and furthermore tne perforation of vanes $3a$ prevents the air stream through the passage between these vanes from carrying the partly dried cut grass rapidly through the space between the drums whereby insufficient predrying might be caused.

By the above described construction a cut grass drying plant is obtained in which the cut grass is passed through a space between the interior of an external stationary drum and the exterior of an internal rotating drum in which space predrying takes place, the predried cut grass being finally passed through the interior of the internal rotating drum for final drying and by this construction the thermal efficiency of the plant may be made high and the size of the plant as well as the power for drying a given quantity of grass may be made to compare favourably with known types of grass dryers.

What I claim and desire to secure by Letters Patent is:

1. A plant for drying green cut crops or the like comprising an inner drum and an outer drum, said drums being coaxially arranged and having a space therebetween, means at one end of said drums for supplying hot drying gas to said inner drum and to the space between said drums, means at the other end of said outer drum for feeding the crop to be dried into the space between said drums, means for rotating said inner drum, means attached to the outside of said inner drum for moving the crop fed into said space through said space from said last mentioned end of said drums to said first mentioned end to partially dry said crop, means for sucking a current of hot air through said inner drum and means for feeding said partially dried crop into that current of hot air to complete the drying of said crop.

2. A plant for drying green cut crops or the like comprising an inner drum and an outer drum, said drums being coaxially arranged and having a space therebetween, means at one end of said drums for supplying hot drying gas to said inner drum and to the space between said drums, means at the other end of said outer drum for feeding the crop to be dried into the space between said drums, means for rotating said inner drum, means attached to the outside of said inner drum for moving the crop fed into said space through said space from said last mentioned end of said drums to said first mentioned end to partially dry said crop, a cyclone, a fan for blowing said partially dry crop from said space into said cyclone and for sucking a current of hot air through said inner drum, said cyclone exhausting the moisture removed from said partially dry crop into the atmosphere, and means connected to said cyclone for feeding said partially dried crop into that current of hot air to complete the drying of said crop.

3. A plant for drying green cut crops or the like comprising an inner drum and an outer drum, said drums being coaxially arranged and having a space therebetween, means at one end of said drums for supplying hot drying gas to said inner drum and to the space between said drums, means at the other end of said outer drum for feeding the crop to be dried into the space between said drums, means for rotating said inner drum, means attached to the outside of said inner drum for moving the crop fed into said space through said space from said last mentioned end of said drums to said first mentioned end to partially dry said crop, means for sucking a current of hot air through said inner drum, said last mentioned means comprising a fan having a housing with the inlet thereof connected to said space for drawing air therethrough and means connected to the outlet of said housing for feeding said partially dried crop into that current of hot air to complete the drying of said crop.

4. A plant for drying green cut crops as set forth in claim 1 further comprising means for separating the fully dried crop from the air current.

5. A plant for drying green cut crops as set forth in claim 1 further characterized in that the means attached to the outside of said inner drum for moving the crop through the space between said drums comprises warm blades, said blades being perforated to facilitate passage of air therethrough.

6. A plant for drying green cut crops as set forth in claim 1 further comprising means consisting of a pair of rotatable perforated drums positioned substantially parallel to each other and having a small space therebetween for receiving the dried crop and means for rotating said perforated drums in opposite directions.

EDGAR WILFRED BORROW.

REFERENCES CITED

The following references are of record in the file of this patent:

UNITED STATES PATENTS

| Number | Name | Date |
| --- | --- | --- |
| 486,806 | Batcheller | Nov. 22, 1892 |
| 617,816 | Senier et al. | Jan. 17, 1899 |
| 684,996 | MacFarlane | Oct. 22, 1901 |
| 1,039,385 | De C. Greene | Sept. 24, 1912 |
| 1,771,141 | Renneburg | July 22, 1930 |
| 1,988,678 | Arnold | Jan. 22, 1935 |